(12) United States Patent
McElfresh et al.

(10) Patent No.: US 8,213,281 B2
(45) Date of Patent: Jul. 3, 2012

(54) CHARACTERIZING THE PERFORMANCE OF A DISK DRIVE ACROSS A RANGE OF VIBRATION FREQUENCIES

(75) Inventors: David K. McElfresh, San Diego, CA (US); Anton A. Bougaev, La Jolla, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 419 days.

(21) Appl. No.: 12/264,110

(22) Filed: Nov. 3, 2008

(65) Prior Publication Data

US 2010/0110857 A1    May 6, 2010

(51) Int. Cl.
*G11B 11/00* (2006.01)

(52) U.S. Cl. .................. 369/53.18; 369/53.43; 702/56

(58) Field of Classification Search ............ 369/54.43, 369/53.18, 53.19; 702/182, 33, 56, 183–186; 318/452, 453, 454, 455
See application file for complete search history.

(56) References Cited

U.S. PATENT DOCUMENTS 7,756,648 B1 * 7/2010 Vaidyanathan et al. ... 369/44.32
* cited by examiner

*Primary Examiner* — Tan X Dinh
(74) *Attorney, Agent, or Firm* — Park, Vaughan, Fleming & Dowler LLP

(57) ABSTRACT

Some embodiments of the present invention provide a system that characterizes the performance of a disk drive at frequencies in a set of frequencies in a frequency range. First, the disk drive is vibrated at each frequency in the set of frequencies, one frequency at a time. During this process, a disk drive performance metric is monitored. Next, the performance of the disk drive is characterized by determining the parameter related to acceleration due to the vibrations for each frequency at which a disk drive performance metric degrades by a predetermined amount from a baseline.

19 Claims, 5 Drawing Sheets

CHARACTERIZING THE PERFORMANCE OF A DISK DRIVE ACROSS A RANGE OF VIBRATION FREQUENCIES

BACKGROUND

1. Field

The present invention generally relates to techniques for characterizing the performance of a disk drive. More specifically, the present invention relates to a method and an apparatus that characterizes the performance of a disk drive at various frequencies in a frequency range.

2. Related Art

Many new higher density disk drives have smaller track sizes and tighter tolerances to increase their storage capacity. Unfortunately, smaller track sizes and tighter tolerances make such disk drives potentially more sensitive to vibrations during operation of the computer system. However, disk drive vendors typically only provide limited information about the sensitivity of their disk drives to vibration, and different vendors often represent the information they do provide in different ways. Furthermore, the information that is provided may not be sufficient to characterize the performance of a disk drive in the vibration environment of a given computer system.

Hence, what is needed is a method and system that characterizes the performance of a disk drive at various frequencies in a frequency range without the above-described problems.

SUMMARY

Some embodiments of the present invention provide a system that characterizes the performance of a disk drive at frequencies in a set of frequencies in a frequency range. First, the disk drive is vibrated at each frequency in the set of frequencies, one frequency at a time. During this process, a disk drive performance metric is monitored. Next, the performance of the disk drive is characterized by determining a parameter related to acceleration due to the vibrations for each frequency at which a disk drive performance metric degrades by a predetermined amount from a baseline.

In some embodiments, the parameter related to acceleration includes at least one of: an amplitude of the vibrations, an angular acceleration, and a linear acceleration.

Some embodiments further include measuring a parameter related to acceleration at a disk drive bay in a computer system, and then, determining a behavior of the disk drive in the computer system based on the measured parameter at the disk drive bay and characterized performance of the disk drive.

In some embodiments, vibrating the disk drive includes vibrating the disk drive along at least two orthogonal axes, one at a time. Moreover, the parameter related to acceleration is measured along the at least two orthogonal axes. The behavior of the disk drive is then determined based on the characterized performance of the disk drive and the measured parameter related to acceleration along the at least two orthogonal axes.

In some embodiments, determining the parameter related to acceleration includes attempting to determine the parameter related to acceleration using an initial value for the parameter determined for one or more nearby frequencies.

In some embodiments, the disk drive is vibrated sinusoidally at frequencies in the set of frequencies.

In some embodiments, characterizing the performance of the disk drive includes vibrating the disk drive along at least two orthogonal axes, one axis at a time, to characterize the performance of the disk drive in the presence of vibrations along the at least two orthogonal axes.

In some embodiments, the disk drive performance metric is based on at least one of: a sequential read rate, a sequential write rate, a random read rate, a random write rate, and a rate of input/output operations.

In some embodiments, monitoring the disk drive performance metric includes running a throughput script on the disk drive.

In some embodiments, the baseline is the value of the disk drive performance metric when the disk drive is not vibrating, and the predetermined amount includes at least one of: a minimum measurable difference in the disk drive performance metric from the baseline during the monitoring of the disk drive performance metric, and a predetermined percentage difference in the disk drive performance metric from the baseline.

Some embodiment further include characterizing the performance of the disk drive by determining the parameter due to the vibrations at each frequency in the set of frequencies at which the disk drive performance metric degrades by a second predetermined amount from the baseline.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1A:
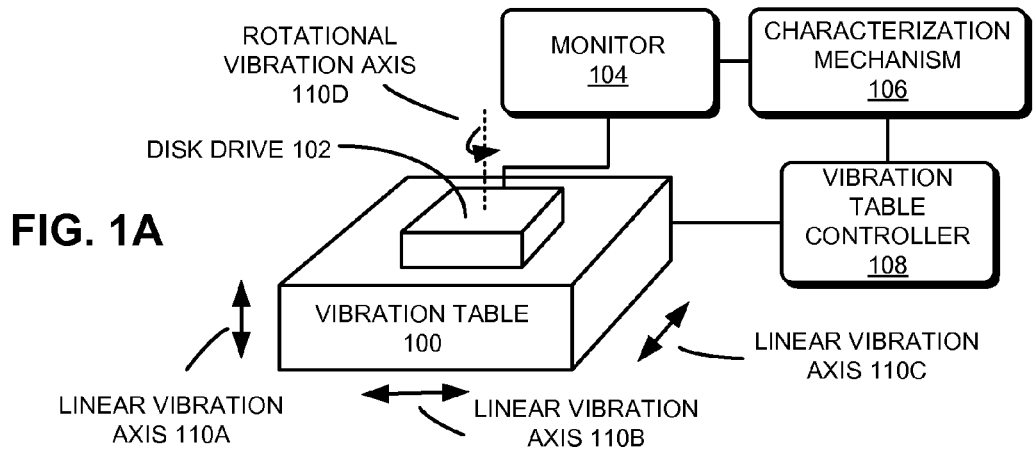
FIG. 1A illustrates an apparatus for characterizing the performance of a disk drive at frequencies in a set of frequencies in a frequency range in accordance with some embodiments of the present invention.

FIG. 1A illustrates an apparatus for characterizing the performance of a disk drive at frequencies in a set of frequencies in a frequency range in accordance with some embodiments of the present invention. Referring to FIG. 1, vibration table 100 is coupled to disk drive 102 which is coupled to monitor 104. Moreover, monitor 104 is coupled to characterization mechanism 106 which is coupled to vibration table controller 108. Lastly, vibration table controller 108 is coupled to vibration table 100.

Note that disk drive 102 can be any disk drive now known or later developed and can include but is not limited to a hard disk drive, a CD drive, or a DVD drive. Also note that vibration table 100 can be any vibration table that can vibrate disk drive 102 along the desired test axes. In some embodiments, vibration table 100 vibrates disk drive 102 sinusoidally at the desired vibration frequency. In the embodiment depicted in FIG. 1A, vibration table 100 can vibrate disk drive 102 along four axes: three linear vibration axes 110A, 110B, and 110C; and one rotational vibration axis 110D. Note that when vibrating along rotational vibration axis 110D, vibration table 100 and disk drive 102 both rotationally vibrate around rotational vibration axis 110D. In some embodiments, a vibration table is used that can vibrate disk drive 102 along more than four axes, which can include vibrating along one or two additional perpendicular rotational vibration axes for a total of five or six axes. In some embodiments, vibration table 100 vibrates disk drive 102 along fewer than four axes.

Monitor 104 is coupled to disk drive 102 and monitors one or more disk drive performance metrics of disk drive 102. Then, information related to the one or more monitored disk drive performance metrics is communicated by monitor 104 to characterization mechanism 106. The monitored disk drive performance metrics can include but are not limited to one or more of the following: a sequential read rate, a sequential write rate, a random read rate, a random write rate, a rate of input/output operations, or any other disk drive operation that can be affected by vibration of disk drive 102 along one or more axes. In some embodiments, monitor 104 runs a disk drive performance metric script to monitor the disk drive performance metrics of disk drive 102. Monitor 104 can be implemented in any technology and any combination of hardware and software. In some embodiments, monitor 104 operates on a computer system.

Characterization mechanism 106 receives information from monitor 104 related to the one or more monitored disk drive performance metrics of disk drive 102. Then, characterization mechanism 106 communicates with vibration table controller 108 to control the vibration frequency and amplitude of the vibrations of vibration table 100. In some embodiments, characterization mechanism 106 controls the vibration frequency and the acceleration profile and/or peak acceleration of vibrations of vibration table 100. The operation of characterization mechanism 106 will be discussed below. Note that characterization mechanism 106 can be implemented in any technology and any combination of hardware and software. In some embodiments, characterization mechanism 106 operates on a computer system.

Vibration table controller 108 controls vibration table 100 based on information from characterization mechanism 106 as discussed below. Note that vibration table controller 108 can be implemented in any technology and any combination of hardware and software. In some embodiments, vibration table controller 108 operates on a computer system. In some embodiments, one or more of monitor 104, characterization mechanism 106, and vibration table controller 108 operate on the same computer system.

Some embodiments of the present invention operate as follows. The axes along which disk drive 102 will be characterized at frequencies in a frequency range are selected based on information including but not limited to: vibration axes that are known or suspected to have an impact on one or more disk drive performance metrics, and measurements of vibrations along vibration axes in one or more computer systems in which disk drive 102 may be used.

In some embodiments, the frequency range for each axis over which the disk drive performance metrics of disk drive 102 are characterized is selected based on information including but not limited to the amplitude or acceleration at vibration frequencies along the given axis that have been measured in one or more computer systems that disk drive 102 may be used in. In some embodiments, the range of frequencies over which disk drive 102 is characterized is determined during the characterization process based on the results of the characterization as the frequency of vibration is varied.

In some embodiments, the vibration range is comprised of a set of vibration frequencies from a minimum frequency to a maximum frequency with each frequency in the frequency range separated from other frequencies in the range by a predetermined amount. In some embodiments, the frequencies in the set of frequencies can be distributed in the frequency range using any desired method, including but not limited to: a constant separation between frequencies; a predetermined percentage difference between frequencies in the set of frequencies; a distribution based on a relationship between the frequencies in the set, including, for example, a logarithmic separation; a distribution based on known or suspected frequency behaviors or physical structures of disk drive 102; or any other separation or distribution desired.

In some embodiments, a baseline disk drive performance metric is determined for disk drive 102 before vibration table 100 begins vibrating. In some embodiments, a throughput script is run by monitor 104 to determine the baseline of the disk drive performance metric for disk drive 102. Monitor 104 then communicates the baseline to characterization mechanism 106.

In some embodiments, after the baseline is determined, characterization mechanism 106 signals vibration table controller 108 to begin vibrating vibration table 100 at the start frequency in the set of frequencies, at a predetermined start amplitude, and along linear vibration axis 110A. Note that in some embodiments, the baseline disk drive performance metric is determined for disk drive 102 for each frequency in the set of frequencies at a predetermined start amplitude for each frequency. In some embodiments, the predetermined start amplitude for each frequency in the set of frequencies is the same, while in other embodiments, the predetermined start amplitude is based on setting a parameter related to acceleration equal at each frequency. For example, in some embodiments, the baseline is determined for each frequency in the set of frequencies based on the disk drive performance metric at each frequency for a vibration amplitude of zero or a low vibration amplitude known to have little or no impact on the disk drive performance metric. Additionally, note that the order in which the vibration axes and/or vibration frequencies in the set of frequencies are characterized can be varied without departing from the present invention.

Vibration table 100 vibrates disk drive 102 along axis 110A while monitor 104 runs the throughput script on disk drive 102 and monitors the disk drive performance metric. Then, information related to the monitored disk drive performance metric is transmitted to characterization mechanism 106. When disk drive 102 is first vibrated at a frequency in the set of frequencies, characterization mechanism 106 determines if the monitored disk drive performance metric is lower than the baseline by a predetermined amount. If the monitored disk drive performance metric is lower than the baseline by the predetermined amount, then characterization mechanism 106 communicates to vibration table controller 108 to reduce the amplitude of the vibrations at the current vibration frequency. The case in which disk drive 102 is first vibrated at a frequency in the set of frequencies and characterization mechanism 106 determines that the monitored disk drive performance metric is not lower than the baseline by the predetermined amount will be handled separately below.

In some embodiments, the predetermined amount lower than the baseline that characterization mechanism 106 checks for can include but is not limited to: a minimum measurable difference in the disk drive performance metric from the baseline that can be measured by monitor 104, a predetermined percentage difference in performance metric from the baseline, or any other absolute or relative change in the performance metric with respect to the baseline.

In some embodiments, the amount by which characterization mechanism 106 reduces the amplitude of the vibrations can include but is not limited to: the minimum amplitude reduction possible based on the combination of vibration table controller 108 and vibration table 100; an amount based on the rate of change of the disk drive performance metric of the disk drive 102 with respect to previous changes of the amplitude; a predetermined amount based on the desired precision of the characterization of the disk drive performance metric; or any other absolute or relative amount.

In some embodiments, the above process continues until characterization mechanism 106 determines that the monitored disk drive performance metric of disk drive 102 is not less than the baseline by the predetermined amount. Characterization mechanism 106 then records the amplitude of the vibrations at the current vibration frequency. In some embodiments, characterization mechanism 106 may record, instead of or in addition to the amplitude of the vibrations at the current frequency, the acceleration profile and/or peak acceleration of the vibrations at the current frequency, or any other parameter related to the acceleration of the vibrations at the current frequency.

Characterization mechanism 106 then controls vibration table controller 108 to begin vibrating at the next frequency in the set of frequencies. In some embodiments, the start amplitude for the next vibration frequency can be set to be a value including but not limited to: a predetermined value, a value equal to a value recorded for a previous frequency near the next frequency, a value based on a projected amplitude for the next frequency based on previously recorded amplitudes at previously characterized frequencies, or zero amplitude. For example, in some embodiments, the frequencies in the set of frequencies are characterized in order from a minimum frequency to a maximum frequency, and the start amplitude at a given frequency is determined by curve-fitting the amplitudes recorded for previously characterized frequencies in the set of frequencies.

In the case in which disk drive 102 is first vibrated at a frequency in the set of frequencies and characterization mechanism 106 determines that the monitored disk drive performance metric is not lower than the baseline by the predetermined amount, then characterization mechanism 106 increases the amplitude of the vibrations at the current frequency by a predetermined amount until the monitored disk drive performance metric is less than the baseline by the predetermined amount. The predetermined amount by which the amplitude of the vibrations at the current frequency is increased can include but is not limited to: the minimum amplitude increase possible based on the combination of vibration table controller 108 and vibration table 100; an amount based on the rate of change of the performance metric of the disk drive 102 with respect to previous changes of the amplitude; a predetermined amount based on the desired precision of the characterization of the disk drive performance metric; or any other absolute or relative amount.

When characterization mechanism 106 determines that the monitored disk drive performance metric is less than the baseline by the predetermined amount, the amplitude of the vibrations at the current frequency is recorded by characterization mechanism 106. In some embodiments, characterization mechanism may record, instead of or in addition to the amplitude of the vibrations at the current frequency, the acceleration profile and/or peak acceleration of the vibrations at the current frequency, or any other parameter related to the acceleration of the vibrations at the current frequency. Characterization mechanism 106 then controls vibration table controller 108 to vibrate vibration table 100 at the next frequency in the set of frequencies at the start amplitude for the next frequency.

The process described above continues until the disk drive performance metric for disk drive 102 has been characterized for each frequency in the set of frequencies using the above process. In some embodiments, the above process is repeated for vibrations at each frequency in the set of frequencies along each axis to be characterized.

Figure 1B:
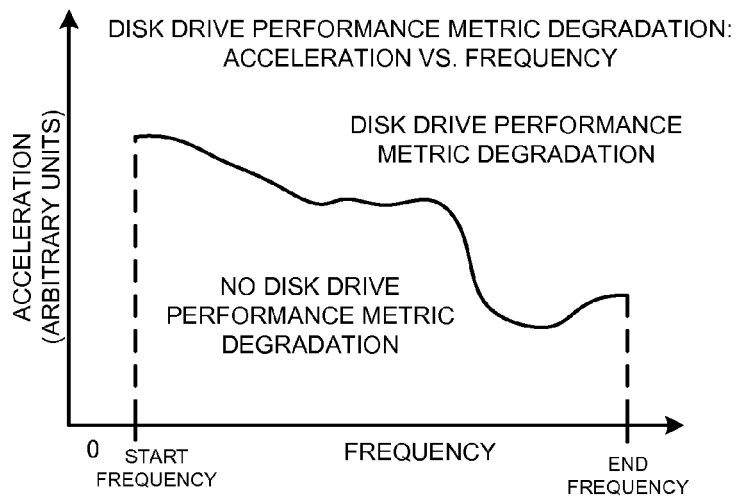
FIG. 1B depicts a graph of acceleration vs. vibration frequency along one vibration axis illustrating a curve dividing a region of disk drive performance metric degradation from a region of no disk drive performance degradation determined in accordance with some embodiments of the present invention.

FIG. 1B depicts a graph of acceleration vs. vibration frequency along one axis illustrating a curve dividing a region of disk drive performance metric degradation from a region of no disk drive performance degradation determined in accordance with some embodiments of the present invention. In some embodiments, the data represented in the graph in FIG. 1B is determined for vibrations along each vibration axis characterized using the above process. Note that in some embodiments, the degradation of the disk drive performance metric is characterized based on a parameter related to acceleration which can include but is not limited to the amplitude of vibrations. In some of these embodiments, the vertical scale of the graph in FIG. 1B measures the amplitude of the vibrations.

In some embodiments, when characterization mechanism 106 determines that the monitored disk drive performance metric is less than the baseline by the predetermined amount, the amplitude of the vibrations at the current frequency (or any other parameter related to the acceleration of the vibrations at the current frequency) is recorded by characterization mechanism 106. Characterization mechanism 106 then increases the amplitude of the vibrations at the current frequency (or any other parameter related to acceleration at the current frequency) until characterization mechanism 106 determines that the monitored disk drive performance metric is less than the baseline by a predetermined amount. Then, the amplitude of the vibrations at the current frequency (or any other parameter related to the acceleration of the vibrations at the current frequency) is recorded by characterization mechanism 106. Characterization mechanism 106 then continues to increase the amplitude of the vibrations at the current frequency (or any other parameter related to acceleration at the current frequency) until characterization mechanism 106 determines that the monitored disk drive performance metric is less than the baseline by a second predetermined amount and the amplitude of the vibrations at the current frequency (or any other parameter related to the acceleration of the vibrations at the current frequency) is recorded by characterization mechanism 106. Characterization mechanism 106 continues this process for a predetermined number of predetermined amounts by which the monitored disk drive performance metric is less than the baseline at each frequency in the set of frequencies.

In some embodiments, the predetermined amounts by which the monitored disk drive performance metric is less than the baseline can include but are not limited to one or more predetermined percentage decrements of the monitored disk drive performance metric from the baseline. For example, in some embodiments, the predetermined amounts include but are not limited to one or more of 10%, 20%, 30%, 40%, 50%, 60%, 70%, and 80% decrease of the monitored disk drive performance metric from the baseline. In some embodiments, characterization mechanism 106 monitors the disk drive performance metric for each increase of the amplitude of the vibrations at the current frequency (or any other parameter related to the acceleration of the vibrations at the current frequency) until a predetermined maximum decrease in the disk drive performance metric is monitored.

Characterization mechanism 106 then continues on to the next frequency in the set of frequencies. In some embodiments, the disk drive performance metric is monitored for each measurable increase of the amplitude of the vibrations at the current frequency (or any other parameter related to the acceleration of the vibrations at the current frequency) until a predetermined reduction of the monitored disk drive performance metric is reached (for example, 80% or 90% reduction from the baseline). Then, curves of acceleration (or any other parameter related to acceleration) vs. frequency can be generated for any desired level of degradation of disk drive performance metric from the baseline.

Figure 1C:
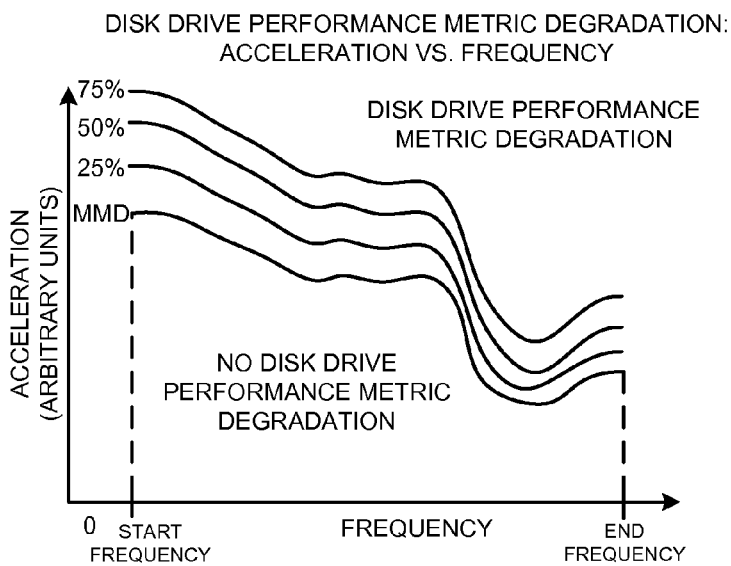
FIG. 1C depicts a graph of acceleration vs. vibration frequency along one vibration axis illustrating a set of curves representing different levels of disk drive performance degradation in accordance with some embodiments of the present invention.

FIG. 1C depicts a graph of acceleration vs. vibration frequency along one vibration axis illustrating a set of iso-degradation curves representing different levels of disk drive performance metric degradation in accordance with some embodiments of the present invention. In FIG. 1C, the four iso-degradation curves depict: (1) the minimum measureable difference (MMD) dividing a region of disk drive performance metric degradation from a region of no disk drive performance degradation; (2) a 25% degradation of the disk drive performance metric from the baseline; (3) a 50% degradation of the disk drive performance metric from the baseline; and (4) a 75% degradation of the disk drive performance metric from the baseline. As noted above, other absolute or relative amounts of degradation of the disk drive performance metric can be used to generate more or fewer iso-degradation curves.

Figure 2A:
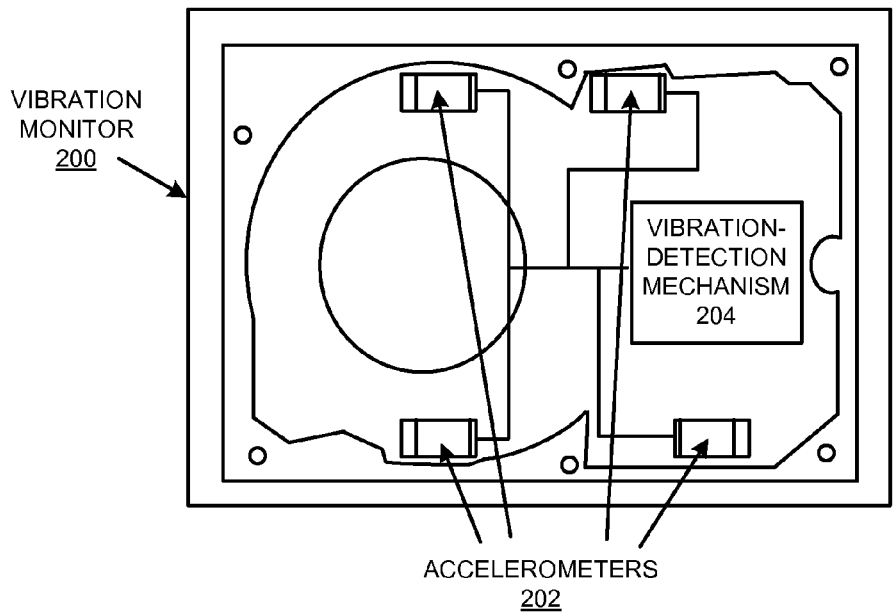
FIG. 2A depicts a vibration monitor that monitors the acceleration of vibrations over a frequency range in accordance with some embodiments of the present invention.

FIG. 2A depicts a vibration monitor that monitors the acceleration of vibrations over a frequency range in accordance with some embodiments of the present invention. Vibration monitor 200 includes accelerometers 202 coupled to vibration-detection mechanism 204. Vibration monitor 200 is configured to have substantially the same mass, mass distribution, and form factor as a disk drive so that the monitored vibrations are not substantially affected by the replacement of a disk drive with vibration monitor 200.

Accelerometers 202 can be any type of acceleration-measuring device including but not limited to integrated electronics piezoelectric accelerometers, micro-electromechanical systems (MEMS) accelerometers, torsional accelerometers, mechanical or optical accelerometers, remote-sensing devices, or any other device or system that can measure acceleration. In some embodiments, accelerometers 202 are three-axis accelerometers that measure linear acceleration along three orthogonal axes. Accelerometers 202 are placed in vibration monitor 200 on the vertices of a known tetrahedron so that the spatial relationship between the locations of accelerometers 202 is known, and such that all four of accelerometers 202 are not in the same plane and no three of accelerometers 202 form a straight line.

Vibration-detection mechanism 204 is coupled to accelerometers 202. Vibration-detection mechanism 204 receives information from accelerometers 202 related to the measured accelerations, and determines the acceleration of vibrations over a frequency range along one or more of three orthogonal linear axes and three rotational axes. In some embodiments, vibration-detection mechanism 204 determines a parameter related to acceleration for vibrations over the frequency range along the one or more of the orthogonal axes. Note that the parameter related to acceleration can include the amplitude of the vibrations along one or more of the axes over the frequency range.

Vibration-detection mechanism 204 can be implemented in any technology and any combination of hardware and software. In some embodiments, vibration-detection mechanism 204 includes a processor. In some embodiments, vibration-detection mechanism 204 operates on the computer system that vibration monitor 200 is being used in or on a separate computer system. In some embodiments, vibration monitor 200 includes a wired or wireless communication mechanism that communicates information related to the acceleration measurement of accelerometers 202 to a storage mechanism and/or a processing mechanism located outside of vibration monitor 200.

During operation of vibration monitor 200, vibration-detection mechanism 204 stores information related to the accelerations monitored by each of accelerometers 202. In some embodiments, vibration-detection mechanism 204 processes the information received from accelerometers 202 and determines the amplitude and/or peak acceleration due to vibrations at each frequency in a frequency range along each axis of vibration of vibration monitor 200 based on the accelerations measured by each of accelerometers 202 and using a sinusoidal basis set. In some embodiments, vibration-detection mechanism 204 further processes the information by transforming it to the frequency domain. In some embodiments, transforming the vibration information from the time domain to the frequency domain involves using a fast Fourier transform (FFT). In other embodiments, other transform functions can be used, including, but not limited to, a Laplace transform, a discrete Fourier transform, a Z-transform, and any other transform technique now known or later developed.

Figure 2B:
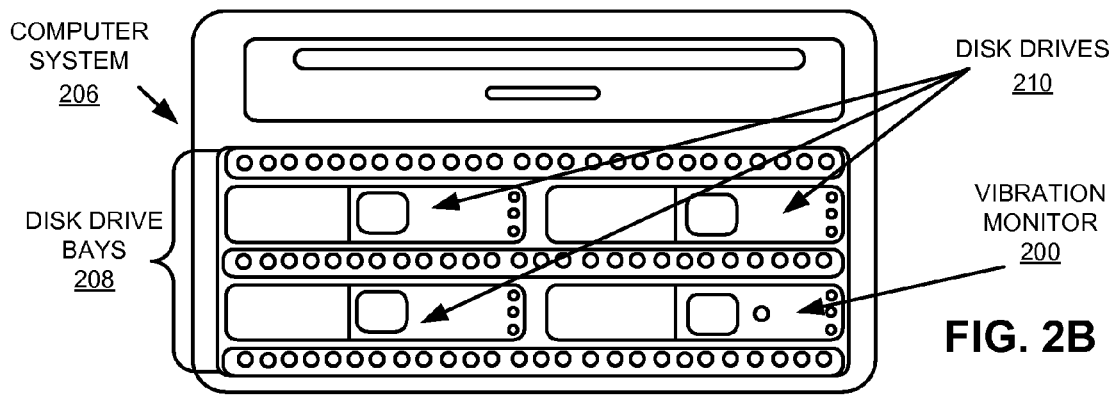
FIG. 2B depicts a computer system, including a vibration monitor, that monitors accelerations due to vibrations in a disk drive bay of a computer system in accordance with some embodiments of the present invention.

FIG. 2B depicts a computer system, including a vibration monitor, that monitors accelerations due to vibrations in a disk drive bay of a computer system in accordance with some embodiments of the present invention. Computer system 206 includes disk drive bays 208. Disk drive bays 208 include disk drives 210, and vibration monitor 200.

During operation of computer system 206, vibrations are transmitted to vibration monitor 200. These vibrations include vibrations generated inside computer system 206 by one or more devices including but not limited to disk drives 210, and fans or other components inside computer system 206, as well as vibrations generated outside of computer system 206 by outside sources. Vibration monitor 200 monitors the vibrations as described above.

In some embodiments, vibration monitor 200 is configured to have substantially the same mass, mass distribution, and form factor as any device in a computer system, including but not limited to a fan, or any device that can be inserted into a field-replaceable unit (FRU) slot. In some embodiments, accelerometers and a vibration-detection mechanism are placed directly into a computer system and are not housed in a vibration monitor.

Figure 2C:
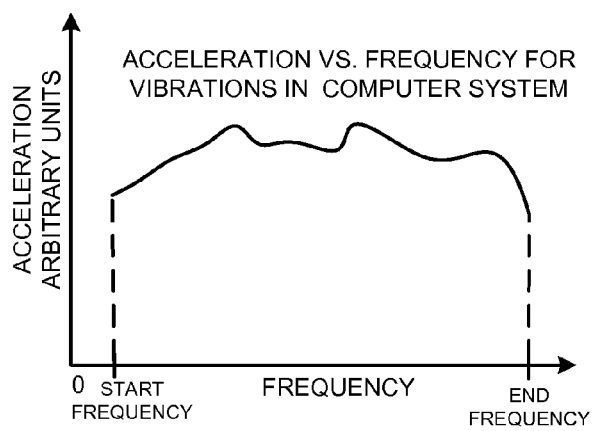
FIG. 2C depicts an example of a graph of acceleration vs. vibration frequency for vibrations along a vibration axis measured in a computer system in accordance with some embodiments of the present invention.

FIG. 2C depicts an example of a graph of acceleration vs. vibration frequency along an axis for vibrations measured in a computer system using a vibration monitor as described above in accordance with some embodiments of the present invention. In some embodiments, disk drive 102 is characterized based on graphs 1B and 2C for each axis of vibration. The data displayed in graph 2C is compared to the data displayed in graph 1B. Vibration frequencies in graph 2C which have an acceleration larger than the acceleration in FIG. 1B separating the degradation region from the no degradation region at the same frequency may result in degradation of the disk drive performance metric for disk drive 102 if it is used in computer system 206. In some embodiments, the data used to generate graphs 1B and 2C are determined for each axis of vibration desired to be characterized, and the above comparison between the data in the two graphs is used to determine if degradation of the disk drive performance metric may be expected to occur if disk drive 102 is used in computer system 206.

In some embodiments, the process described above to collect data for acceleration vs. frequency for computer system 206 is performed on one or more additional computer systems in which disk drive 102 may be used. The performance of disk drive 102 in each computer system can then be characterized as discussed above with reference to FIG. 1B and FIG. 2C.

In some embodiments, the data collected by the above process to characterize the disk drive performance metric for all of the axes characterized are combined to generate a measure of the probability that a disk drive performance metric will degrade when subjected to vibrations. In some embodiments, data are combined based on the amount by which the value of the acceleration or amplitude at which performance degradation begins at each frequency for each vibration axis exceeds a predetermined threshold for that frequency and axis. In some embodiments, the threshold at each frequency for each axis is determined based on vibration amplitudes and/or accelerations monitored for one or more computer systems.

Figure 3:
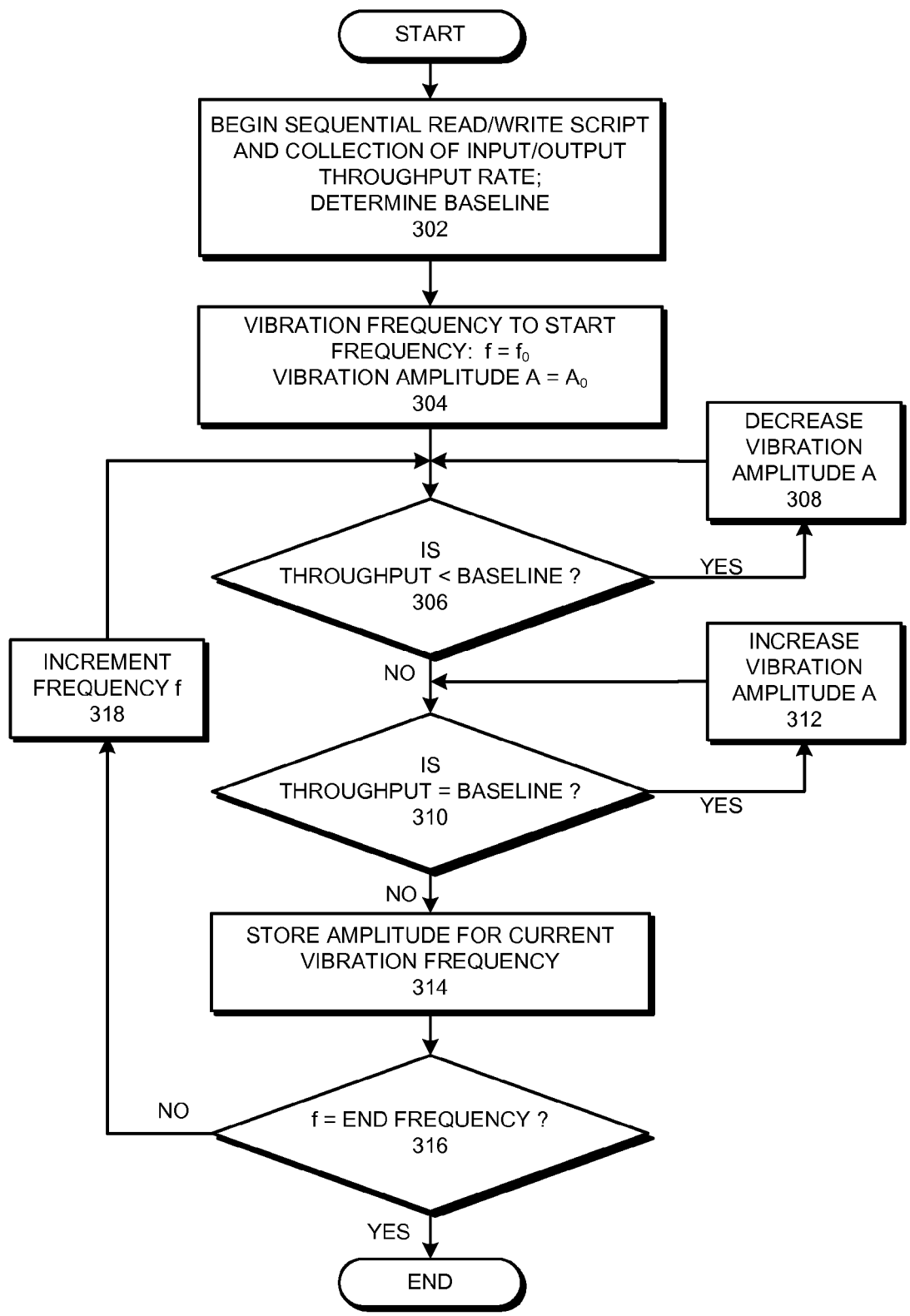
FIG. 3 presents a flowchart illustrating a process for characterizing a disk drive at frequencies in a set of frequencies in a frequency range in accordance with some embodiments of the present invention.

FIG. 3 presents a flowchart illustrating a process for characterizing a disk drive at frequencies in a set of frequencies in a frequency range in accordance with some embodiments of the present invention. First, a sequential read/write script is started on the disk drive being tested while the input/output throughput rate is collected. Then, the baseline reading of the input/output throughput rate is collected (step 302). Next, the disk drive is vibrated at the starting vibration frequency for the test frequency range, and the amplitude for the vibration is set to the start amplitude (step 304). Note that in some embodiments, the start amplitude is set to zero. Next, if the throughput of the disk drive is less than the baseline throughput (step 306), then the amplitude of the vibrations is decreased by a predetermined amount (step 308) and the process returns to step 306. When the throughput of the disk drive is not less than the baseline throughput (step 306), the process continues to step 310. If the throughput of the disk drive is equal to the baseline (step 310), then the amplitude of the vibrations is increased by a predetermined amount (step 312). If the throughput is not equal to the baseline (step 310), then the amplitude for the current vibration frequency is stored (step 314). If the current frequency is the end frequency for the frequency range (step 316), then the process ends. If the current frequency is not the end frequency of the frequency range (step 316), then the current frequency is incremented by a predetermined amount (step 318) and the process returns to step 306. Note that in some embodiments, the vibration amplitude is set to zero when the process returns to step 306.

Figure 4:
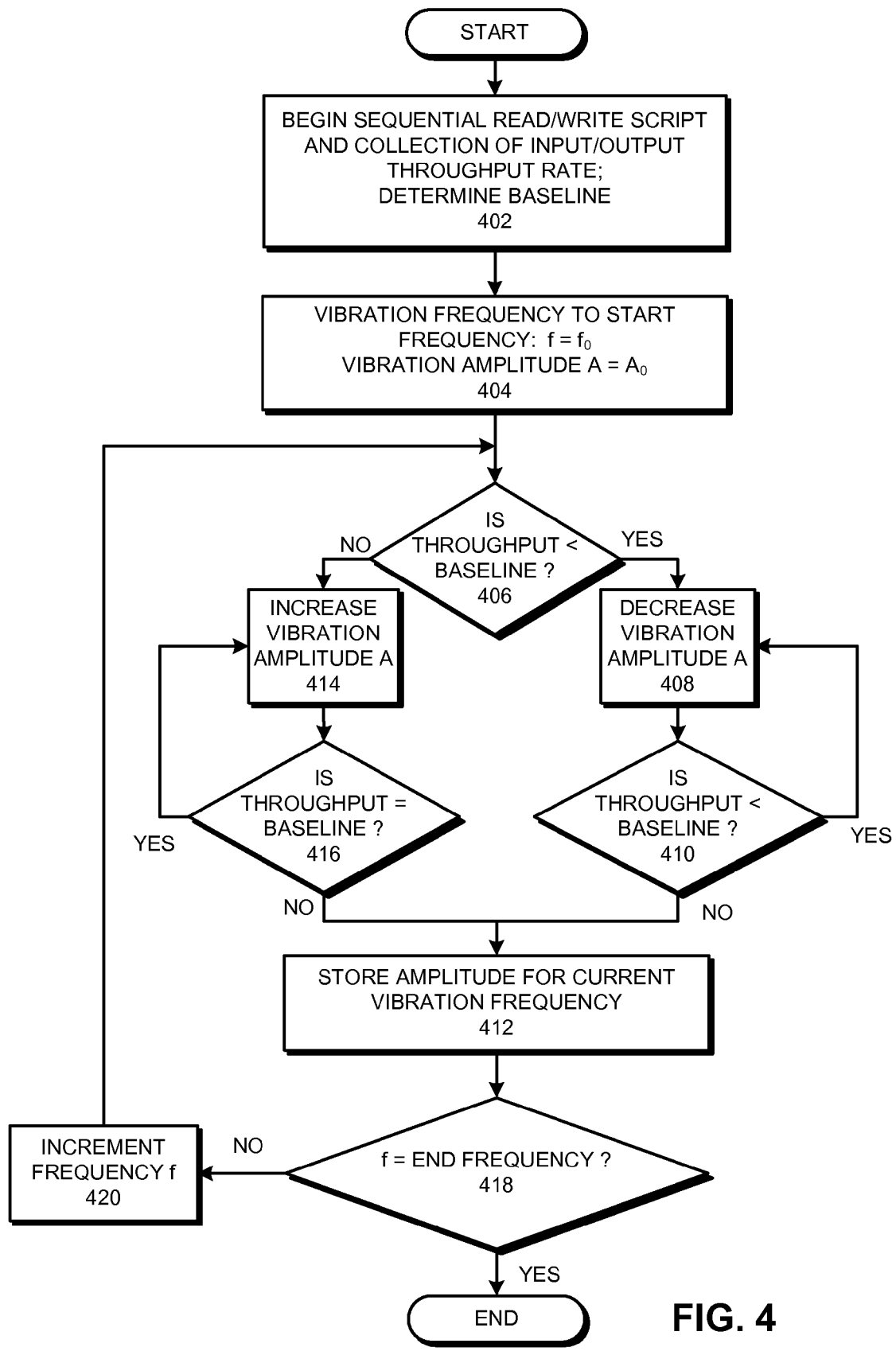
FIG. 4 presents a flowchart illustrating a process for characterizing a disk drive at frequencies in a set of frequencies in a frequency range in accordance with some embodiments of the present invention.

FIG. 4 presents a flowchart illustrating a process for characterizing a disk drive at frequencies in a set of frequencies in a frequency range in accordance with some embodiments of the present invention. First, a sequential read/write script is started on the disk drive being tested while the input/output throughput rate is collected. In some embodiments, disk drive performance metrics other than and/or in addition to throughput rate are collected. A baseline reading of the input/output throughput rate is also collected (step 402). Then, the disk drive is vibrated at the starting vibration frequency for the test frequency range and the amplitude for the vibration is set to the start amplitude (step 404). Note that in some embodiments, the start amplitude is set to zero. Next, if the throughput of the disk drive is less than the baseline throughput (step 406), then the amplitude of the vibration is decreased by a predetermined amount (step 408). If the throughput of the disk drive is still less than the baseline (step 410), then the process returns to step 408. If the throughput is not less than the baseline, then the process continues on to step 412.

At step 406, if the throughput is not less than the baseline, then the amplitude of the vibration is increased by a predetermined amount (step 414). If the throughput is equal to the baseline throughput (step 416), then the process returns to step 414. If the throughput is not equal to the baseline, then the process continues on to step 412. At step 412 the amplitude for the current vibration frequency is stored. Then, if the current frequency is not equal to the end frequency for the frequency range being tested (step 418), the current frequency is incremented by a predetermined amount (step 420) and the process returns to step 406. Note that in some embodiments, the vibration amplitude is set to zero when the process returns to step 406. Then, if the current frequency is equal to the end frequency (step 418), then the process ends.

In some embodiments, the amplitude stored at step 412 depends on whether the process came to step 412 from step 416 or step 410. In some embodiments, when the process comes to step 412 from step 416, the amplitude stored is the current amplitude minus an amount equal to the amount added to the amplitude in step 414. In these embodiments, the stored amplitudes comprise the maximum tested amplitude at which the throughput is equal to the baseline. In other words, adding the predetermined amount to the amplitude would cause the throughput to fall below the baseline. Additionally, in some embodiments, when the process comes to step 412 from step 410, the amplitude stored is the current amplitude plus an amount equal to the amount subtracted from the amplitude in step 408. In these embodiments, the stored amplitudes comprise the minimum tested amplitudes at which the throughput falls below the baseline.

Figure 5:
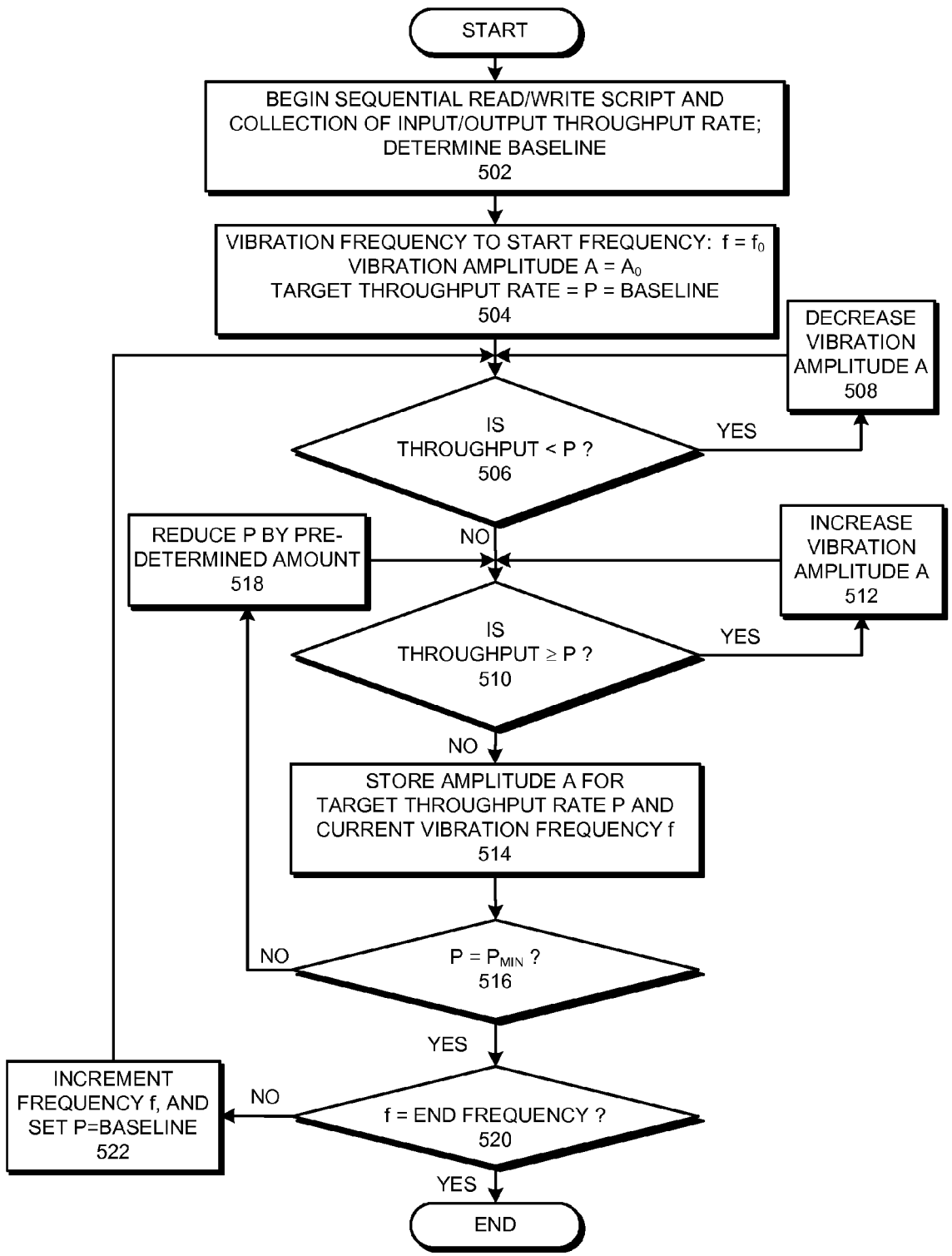
FIG. 5 presents a flowchart illustrating a process for characterizing a disk drive at different levels of disk drive performance degradation at frequencies in a set of frequencies in a frequency range in accordance with some embodiments of the present invention.

FIG. 5 presents a flowchart illustrating a process for generating iso-degradation curves characterizing disk drive performance degradation at frequencies in a set of frequencies in a frequency range in accordance with some embodiments of the present invention. First, a sequential read/write script is started on the disk drive being tested while the input/output throughput rate is collected (step 502). Then, the baseline reading of the input/output throughput rate is collected (step 502). Next, the disk drive is vibrated at the starting vibration frequency for the test frequency range, the amplitude for the vibration is set to the start amplitude, and the target input/output throughput rate is set equal to the baseline throughput rate (step 504). Note that in some embodiments, the start amplitude is set to zero. Next, if the throughput of the disk drive is less than the target throughput rate (step 506), then the amplitude of the vibrations is decreased by a predetermined amount (step 508) and the process returns to step 506. When the throughput of the disk drive is not less than the target throughput rate (step 506), the process continues to step 510. If the throughput of the disk drive is greater than or equal to the target throughput rate (step 510), then the amplitude of the vibrations is increased by a predetermined amount (step 512). If the throughput is not greater than or equal to the target throughput rate (step 510), then the amplitude, and throughput rate and/or target throughput rate for the current vibration frequency are stored (step 514). Note that in some embodiments, in one or both of steps 508 and 512 prior to changing the vibration amplitude, the throughput of the disk drive is stored along with the vibration frequency, f, and the vibration amplitude, A. In some of these embodiments, the information stored in steps 508 and/or 512 is used to generate degradation curves, which may include iso-degradation curves, for characterizing disk drive throughput at different vibration amplitudes (or any other parameter related to the acceleration of the vibrations) and vibration frequencies in the frequency range.

Then, if the target throughput rate is not equal to the minimum target throughput rate (step 516), then the target throughput rate is reduced by a predetermined amount (step 518) and the process continues on to step 510. If the target throughput rate is equal to the minimum target throughput rate (516), then the process continues on to step 520. If the current frequency is the end frequency for the frequency range (step 520), then the process ends. If the current frequency is not the end frequency of the frequency range (step 520), then the current frequency is incremented by a predetermined amount and the target throughput rate is set equal to the baseline throughput (step 522) and the process returns to step 506.

Note that in some embodiments, at step 518, the target throughput rate, P, is reduced by a different predetermined amount based on one or more of: the previous target throughput rate, the amplitude stored for the previous target throughput rate, and the current frequency. Additionally, in some embodiments, the target throughput rates include a set of target throughput rates, and step 518 steps through each target throughput rate in the set of target throughput rates. Step 516 then determines if the current target throughput rate is the last target throughput rate in the set. Furthermore, in some embodiments, the target throughput rates in the set of target throughput rates are not ordered from highest to lowest and step 518 returns to step 506 instead of step 510.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for characterizing a performance of a disk drive at frequencies in a set of frequencies in a frequency range, the method comprising:
   vibrating the disk drive at each frequency in the set of frequencies, one frequency at a time;
   monitoring a disk drive performance metric while the disk drive is vibrating;
   characterizing the performance of the disk drive by determining a parameter related to acceleration due to the vibrations at each frequency in the set of frequencies at which the disk drive performance metric degrades by a predetermined amount from a baseline;
   using a dedicated vibration-detection mechanism to measure the parameter related to acceleration at a disk drive bay in a computer system; and
   determining a behavior of the disk drive in the computer system based on the measured parameter related to acceleration and the characterized performance of the disk drive.

2. The method of claim 1, wherein the parameter related to acceleration includes at least one of:
   an amplitude of the vibrations;
   an angular acceleration; and
   a linear acceleration.

3. The method of claim 1,
   wherein vibrating the disk drive includes vibrating the disk drive along at least two orthogonal axes, one axis at a time;
   wherein measuring the parameter related to acceleration at the disk drive bay includes measuring the parameter related to acceleration along the at least two orthogonal axes; and
   wherein the method further comprises determining the behavior of the disk drive in the computer system based on the characterized performance of the disk drive in the presence of vibration along the at least two orthogonal axes and the measured parameter related to acceleration along the at least two orthogonal axes.

4. The method of claim 1, wherein:
   determining the parameter related to acceleration includes attempting to determine the parameter related to acceleration using an initial value for the parameter related to acceleration determined for one or more nearby frequencies in the set of frequencies.

5. The method of claim 3, wherein the disk drive is vibrated sinusoidally at frequencies in the set of frequencies.

6. The method of claim 1, wherein:
   vibrating the disk drive includes vibrating the disk drive along at least two orthogonal axes, one axis at a time.

7. The method of claim 1, wherein the disk drive performance metric is based on at least one of:
   a sequential read rate;
   a sequential write rate;
   a random read rate;
   a random write rate; and
   a rate of input/output operations.

8. The method of claim 1, wherein:
   monitoring the disk drive performance metric includes running a throughput script on the disk drive.

9. The method of claim 1, wherein:
   the baseline is the value of the disk drive performance metric when the disk drive is not vibrating; and
   the predetermined amount includes at least one of:

a minimum measurable difference in the disk drive performance metric from the baseline during the monitoring of the disk drive performance metric; and a predetermined percentage difference in disk drive performance metric from the baseline.

10. A non-transitory computer-readable storage medium storing instructions that when executed by a computer cause the computer to perform a method for characterizing a performance of a disk drive at frequencies in a set of frequencies in a frequency range, the method comprising:

vibrating the disk drive at each frequency in the set of frequencies, one frequency at a time;

monitoring a disk drive performance metric while the disk drive is vibrating;

characterizing the performance of the disk drive by determining a parameter related to acceleration due to the vibrations at each frequency in the set of frequencies at which the disk drive performance metric degrades by a predetermined amount from a baseline;

using a dedicated vibration-detection mechanism to measure the parameter related to acceleration at a disk drive bay in a computer system; and determining a behavior of the disk drive in the computer system based on the measured parameter related to acceleration and the characterized performance of the disk drive.

11. The computer-readable storage medium of claim 10, wherein the parameter related to acceleration includes at least one of:

an amplitude of the vibrations;
an angular acceleration; and
a linear acceleration.

12. The computer-readable storage medium of claim 10, wherein vibrating the disk drive includes vibrating the disk drive along at least two orthogonal axes, one axis at a time;

wherein measuring the parameter related to acceleration at the disk drive bay includes measuring the parameter related to acceleration along the at least two orthogonal axes; and wherein the method further comprises determining the behavior of the disk drive in the computer system based on the characterized performance of the disk drive in the presence of vibration along the at least two orthogonal axes and the measured parameter related to acceleration along the at least two orthogonal axes.

13. The computer-readable storage medium of claim 10, wherein determining the parameter related to acceleration includes attempting to determine the parameter related to acceleration using an initial value for the parameter related to acceleration determined for one or more nearby frequencies in the set of frequencies; and wherein the disk drive is vibrated sinusoidally at frequencies in the set of frequencies.

14. The computer-readable storage medium of claim 10, wherein:

vibrating the disk drive includes vibrating the disk drive along at least two orthogonal axes, one axis at a time.

15. The computer-readable storage medium of claim 10, wherein the disk drive performance metric is based on at least one of:

a sequential read rate;
a sequential write rate;
a random read rate;
a random write rate; and
a rate of input/output operations.

16. The computer-readable storage medium of claim 10, wherein:

monitoring the disk drive performance metric includes running a throughput script on the disk drive.

17. The computer-readable storage medium of claim 10, wherein:

the baseline is the value of the disk drive performance metric when the disk drive is not vibrating; and the predetermined amount includes at least one of:
a minimum measurable difference in the disk drive performance metric from the baseline during the monitoring of the disk drive performance metric; and
a predetermined percentage difference in the disk drive performance metric from the baseline.

18. An apparatus that characterizes a performance of a disk drive at frequencies in a set of frequencies in a frequency range, the apparatus comprising:

a vibrating mechanism configured to vibrate the disk drive at each frequency in the set of frequencies, one frequency at a time;

a monitoring mechanism configured to monitor a disk drive performance metric while the disk drive is vibrating;

a determining mechanism configured to characterize the performance of the disk drive by determining a parameter related to acceleration due to the vibrations at each frequency in the set of frequencies at which the disk drive performance metric degrades by a predetermined amount from a baseline, a dedicated vibration-detection mechanism configured to measure the parameter related to acceleration at a disk drive bay in a computer system; and wherein the determining mechanism is further configured to determine a behavior of the disk drive in the computer system based on the measured parameter related to acceleration and the characterized performance of the disk drive.

19. The method of claim 1, wherein using a dedicated vibration-detection mechanism to measure the parameter related to acceleration at a disk drive bay in a computer system comprises:

using a vibration-detection mechanism with at least one of:
a mass within a predetermined value of a mass of the disk drive,
a mass distribution within a predetermined value of the mass distribution of the disk drive, or
a form factor within a predetermined value of the form factor of the disk drive.

* * * * *